(12) United States Patent
Okada

(10) Patent No.: US 10,865,856 B2
(45) Date of Patent: Dec. 15, 2020

(54) CONTROL APPARATUS FOR VEHICLE DRIVE-FORCE TRANSMITTING APPARATUS

(71) Applicant: TOYOTA JIDOSHA KABUSHIKI KAISHA, Toyota (JP)

(72) Inventor: Kentaroh Okada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/535,512

(22) Filed: Aug. 8, 2019

(65) Prior Publication Data

US 2020/0088269 A1 Mar. 19, 2020

(30) Foreign Application Priority Data

Sep. 18, 2018 (JP) ................................. 2018-174255

(51) Int. Cl.
| | |
|---|---|
| *B60W 10/115* | (2012.01) |
| *F16H 3/78* | (2006.01) |
| *B60W 10/02* | (2006.01) |
| *B60L 15/20* | (2006.01) |
| *F16H 57/04* | (2010.01) |

(Continued)

(52) U.S. Cl.
CPC ............... *F16H 3/78* (2013.01); *B60W 10/02* (2013.01); *B60W 10/115* (2013.01); *B60L 15/2018* (2013.01); *B60W 30/1843* (2013.01); *B60W 30/19* (2013.01); *B60W 2510/0291* (2013.01); *B60W 2510/107* (2013.01); *B60W 2520/10* (2013.01); *B60W 2710/021* (2013.01); *F16H 57/0478* (2013.01); *F16H 2061/163* (2013.01)

(58) Field of Classification Search
CPC ............. Y10T 477/65; Y10T 477/6203; Y10T 477/6217; F16H 3/78; F16H 2059/725; F16H 61/0437; F16H 2061/0474; F16H 37/022; F16H 2061/163; B60W 10/115; B60W 30/1843; B60W 30/19; B60W 2510/107; B60W 2510/0291; B60W 2520/10; B60W 2710/021
USPC .................................................. 475/208, 209
See application file for complete search history.

(56) References Cited

U.S. PATENT DOCUMENTS

| | | |
|---|---|---|
| 2015/0087463 A1 | 3/2015 | Nakagawa et al. |
| 2019/0145516 A1* | 5/2019 | Murakami ............ F16H 61/662 475/208 |
| 2019/0271391 A1* | 9/2019 | Takeda .................... F16H 61/04 |

FOREIGN PATENT DOCUMENTS

WO 2013/176208 A1 11/2013

* cited by examiner

*Primary Examiner* — Roger L Pang
(74) *Attorney, Agent, or Firm* — Oliff PLC

(57) ABSTRACT

A control apparatus for a drive-force transmitting apparatus that defines a first drive-force transmitting path that is to be established by engagements of a first frictional engagement device and a dog clutch and a second drive-force transmitting path in which a lower gear ratio is provided than in the first drive-force transmitting path. In a second running mode with the second drive-force transmitting path being established, the control apparatus places the dog clutch in a released state when a vehicle running speed is higher than a first speed value, and places the dog clutch in an engaged state when the running speed is not higher than the first speed value. Further, in the second running mode, the control apparatus inhibits the dog clutch from being switched to the released state when an accumulated heat (Continued)

quantity in a synchromesh mechanism of the dog clutch is larger than a first quantity value.

8 Claims, 4 Drawing Sheets

(51) Int. Cl.
*B60W 30/19* (2012.01)
*B60W 30/184* (2012.01)
*F16H 61/16* (2006.01)

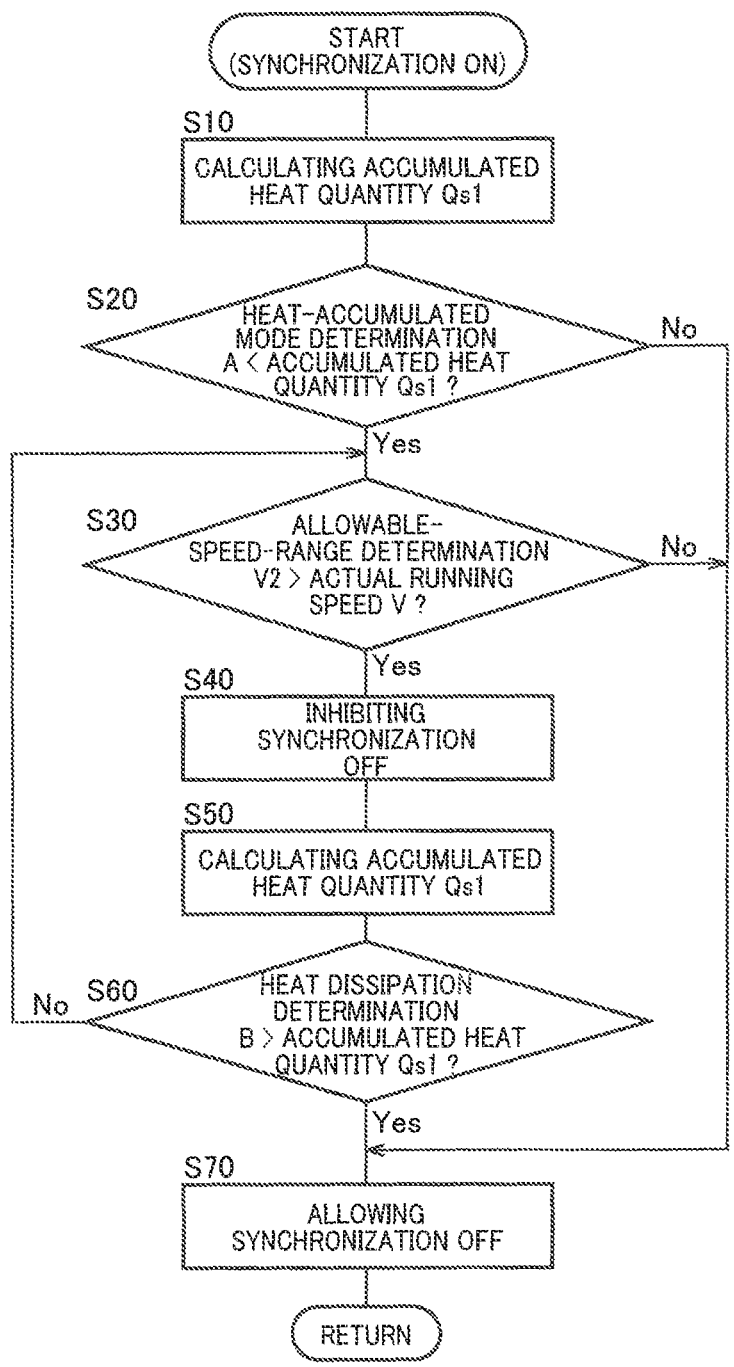

CONTROL APPARATUS FOR VEHICLE DRIVE-FORCE TRANSMITTING APPARATUS

This application claims priority from Japanese Patent Application No. 2018-174255 filed on Sep. 18, 2018, the disclosure of which is herein incorporated by reference in its entirety.

FIELD OF THE INVENTION

The present invention relates to a control apparatus for a drive-force transmitting apparatus that is to be provided in a vehicle, wherein the drive-force transmitting apparatus defines a plurality of drive-force transmitting paths that are provided in parallel with each other between a drive force source and drive wheels of the vehicle, and wherein the plurality of drive-force transmitting paths include a drive-force transmitting path that is provided with a dog clutch that is equipped with a synchromesh mechanism.

BACKGROUND OF THE INVENTION

There is known a control apparatus for a drive-force transmitting apparatus that is to be provided in a vehicle having a drive force source and drive wheels, wherein the drive-force transmitting apparatus includes an input rotary member to which a drive force of the drive force source is to be transmitted, an output rotary member through which the drive force is to be transmitted to the drive wheels, a gear mechanism configured to provide at least one gear ratio, a continuously-variable transmission mechanism configured to provide a continuously-variable gear ratio that is lower than the at least one gear ratio of the gear mechanism, a first frictional engagement device, a second frictional engagement device, and a dog clutch that is provided with a synchromesh mechanism, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path that is to be established by engagements of the first frictional engagement device and the dog clutch, such that the drive force is to be transmitted from the input rotary member to the output rotary member through the gear mechanism along the first drive-force transmitting path when the first drive-force transmitting path is established, wherein the plurality of drive-force transmitting paths include a second drive-force transmitting path that is to be established by engagement of the second frictional engagement device, such that the drive force is to be transmitted from the input rotary member to the output rotary member through the continuously-variable transmission mechanism along the second drive-force transmitting path when the second drive-force transmitting path is established. For example, WO2013/176208 discloses such a drive-force transmitting apparatus. In the disclosed drive-force transmitting apparatus, the vehicle starts to run in a state in which the first drive-force transmitting path is established, and then the vehicle runs with the drive force being transmitted along the second drive-force transmitting path that is established by release of the first frictional engagement device and engagement of the second frictional engagement device when a running speed of the vehicle is increased after the start of running. Further, in the disclosed drive-force transmitting apparatus, the dog clutch is switched from its engaged state to its released state, in the state in which the vehicle runs with the drive force being transmitted along the second drive-force transmitting path.

SUMMARY OF THE INVENTION

By the way, there could be an arrangement in which, when the running speed becomes not higher than a predetermined speed value during running with the drive force being transmitted along the second drive-force transmitting path, the dog clutch is switched to its engaged state in preparation for execution of a stepped shift-down action, i.e., switching from the second drive-force transmitting path to the first drive-force transmitting path, which is made by release of the second frictional engagement device and engagement of the first frictional engagement device. In this arrangement, if the running speed remains in the vicinity of the predetermined speed value, the switching of the dog clutch between the engaged state and the released state could be repeated in a short period. During process of the switching of the dog clutch from the released state to the engaged state, heat is likely to be generated on mutually-contacted surfaces of a synchronizer ring and a conical portion of the synchromesh mechanism. Therefore, if the switching of the dog clutch between the engaged state and the released state is repeated in a short period, the heat generation on the mutually-contacted surfaces of the synchromesh mechanism would be repeated in a short period, so that a large quantity of heat would be accumulated on the contacted surfaces of the synchromesh mechanism. The largely accumulated quantity of heat on the contacted surfaces are likely to cause reduction of a friction generated between the contact surfaces, due to a temporary reduction of a coefficient of the friction and a deterioration of friction members constituting the contacted surfaces, so that there is a risk of reduction of function of the synchromesh mechanism, which is to synchronize rotational speeds.

The present invention was made in view of the background art described above. It is therefore an object of the present invention to provide a control apparatus for a vehicle drive-force transmitting apparatus, which is capable of restraining reduction of function of a synchromesh mechanism that could be caused by increase of accumulated heat quantity during running of a vehicle in a second running mode in which the vehicle is to run with a driving force being transmitted along a second drive-force transmitting path.

The object indicated above is achieved according to the following aspects of the present invention.

According to a first aspect of the invention, there is provided a control apparatus for a drive-force transmitting apparatus that is to be provided in a vehicle having a drive force source and drive wheels, wherein the drive-force transmitting apparatus includes: an input rotary member to which a drive force of the drive force source is to be transmitted; an output rotary member through which the drive force is to be transmitted to the drive wheels; a gear mechanism configured to provide at least one gear ratio; a continuously-variable transmission mechanism configured to provide a continuously-variable gear ratio that is lower than the at least one gear ratio of the gear mechanism; a first frictional engagement device; a second frictional engagement device; and a dog clutch that is provided with a synchromesh mechanism, wherein the drive-force transmitting apparatus defines a plurality of drive-force transmitting paths that are provided in parallel with each other between the input rotary member and the output rotary member, wherein the plurality of drive-force transmitting paths include a first drive-force transmitting path that is to be established by engagements of the first frictional engagement device and the dog clutch, such that the drive force is to be transmitted from the input rotary member to the output rotary member through the gear mechanism along the first drive-force transmitting path when the first drive-force transmitting path is established, wherein the plurality of drive-force transmitting paths include a second drive-force transmitting path that is to be established by engagement of the second frictional engagement device, such that the drive force is to be transmitted from the input rotary member to the output rotary member through the continuously-variable transmission mechanism along the second drive-force transmitting path when the second drive-force transmitting path is established, and wherein the control apparatus comprises: (a) a transmission-shifting control portion configured, during running of the vehicle in a second running mode in which the vehicle is to run with the driving force being transmitted through the continuously-variable transmission mechanism along the second drive-force transmitting path, to place the dog clutch in a released state when a running speed of the vehicle is higher than a first speed value, and to place the dog clutch in an engaged state when the running speed of the vehicle is not higher than the first speed value; (b) an accumulated-heat-quantity calculating portion configured, when the dog clutch is placed in the engaged state during the running of the vehicle in the second running mode, to calculate an accumulated heat quantity that is a quantity of heat accumulated in the synchromesh mechanism; and (c) a synchronization-operation limiting portion configured, during the running of the vehicle in the second running mode, to inhibit the dog clutch from being switched from the engaged state to the released state when the accumulated heat quantity in the synchromesh mechanism is larger than a first quantity value, and to allow the dog clutch to be switched from the engaged state to the released state when the accumulated heat quantity in the synchromesh mechanism is not larger than the first quantity value. For example, the synchronization-operation limiting portion is configured, when the accumulated heat quantity in the synchromesh mechanism is larger than the first quantity value during the running of the vehicle in the second running mode, to inhibit the dog clutch from being switched from the engaged state to the released state, irrespective of whether the running speed of the vehicle is higher than the first speed value, and the synchronization-operation limiting portion is configured, when the accumulated heat quantity in the synchromesh mechanism is not larger than the first quantity value during the running of the vehicle in the second running mode, to allow the dog clutch to be switched from the engaged state to the released state, as long as the running speed of the vehicle is higher than the first speed value.

According to a second aspect of the invention, in the control apparatus according to the first aspect of the invention, during inhibition of switching of the dog clutch from the engaged state to the released state, the synchronization-operation limiting portion is configured, when the accumulated heat quantity in the synchromesh mechanism is not smaller than a second quantity value that is smaller than the first quantity value, to keep inhibiting the dog clutch from being switched from the engaged state to the released state, and is configured, when the accumulated heat quantity in the synchromesh mechanism is smaller than the second quantity value, to allow the dog clutch to be switched from the engaged state to the released state.

According to a third aspect of the invention, in the control apparatus according to the first or second aspect of the invention, the synchronization-operation limiting portion is configured, when the running speed of the vehicle is not lower than a second speed value that is higher than the first speed value, to allow the dog clutch to be switched from the engaged state to the released state, irrespective of whether the accumulated heat quantity in the synchromesh mechanism is larger than the first quantity value or not, or irrespective of whether the accumulated heat quantity in the synchromesh mechanism is larger than the second quantity value or not.

According to a fourth aspect of the invention, in the control apparatus according to the third aspect of the invention, the second speed value is a lower limit value of a running speed range in which the vehicle is inhibited from being switched from the second running mode to a first running mode in which the vehicle is to run with the driving force being transmitted through the gear mechanism along the first drive-force transmitting path.

According to a fifth aspect of the invention, in the control apparatus according to any one of the first through fourth aspects of the invention, the accumulated-heat-quantity calculating portion is configured to calculate the accumulated heat quantity in the synchromesh mechanism, based on a generated heat quantity and a dissipated heat quantity, wherein the generated heat quantity is a quantity of heat generated in the synchromesh mechanism in process of switching of the dog clutch from the released state to the engaged state, and wherein the dissipated heat quantity is a quantity of heat dissipated from the synchromesh mechanism, and is dependent on a length of time for which the dog clutch is held in the engaged state. For example, the accumulated-heat-quantity calculating portion is configured to calculate the accumulated heat quantity in the synchromesh mechanism, such that the calculated accumulated heat quantity is a heat quantity value that is obtained by subtracting the dissipated heat quantity from the generated heat quantity, wherein the dissipated heat quantity is increased with increase of the length of time for which the dog clutch is held in the engaged state.

In the control apparatus according to the first aspect of the invention, during the running of the vehicle in the second running mode, the dog clutch is inhibited from being switched from the engaged state to the released state when the accumulated heat quantity in the synchromesh mechanism is larger than the first quantity value, and is allowed to be switched from the engaged state to the released state when the accumulated heat quantity in the synchromesh mechanism is not larger than the first quantity value. Thus, even if the running speed remains in the vicinity of the first speed value, the switching of the dog clutch between the engaged state and the released state can be restrained from being repeated in a short period when the accumulated heat quantity in the synchromesh mechanism is larger than the first quantity value, so that a large quantity of heat is unlikely to be accumulated in the synchromesh mechanism. It is therefore possible to restrain reduction of function of the synchromesh mechanism which could be caused by increase of the accumulated heat quantity, during running of the vehicle in the second running mode.

In the control apparatus according to the second aspect of the invention, during inhibition of switching of the dog clutch from the engaged state to the released state, the dog clutch is kept inhibited from being switched from the engaged state to the released state when the accumulated heat quantity in the synchromesh mechanism is not smaller than the second quantity value that is smaller than the first quantity value, and the dog clutch is allowed to be switched from the engaged state to the released state when accumulated heat quantity in the synchromesh mechanism is smaller than the second quantity value. Thus, when the switching of the dog clutch from the engaged state to the released state has been once inhibited, the engaged state of the dog clutch is maintained until the heat is dissipated from the synchromesh mechanism to a certain degree. Further, since the dog clutch is allowed to be switched to the released state when the heat has been dissipated to a certain degree, a large quantity of heat is unlikely to be accumulated in the synchromesh mechanism, even if heat is generated in the synchromesh mechanism in case of switching of the dog clutch back to the engaged state immediately after switching of the dog clutch to the released state.

In the control apparatus according to the third aspect of the invention, when the running speed of the vehicle is not lower than the second speed value that is higher than the first speed value, the dog clutch is allowed to be switched from the engaged state to the released state, irrespective of whether the accumulated heat quantity in the synchromesh mechanism is larger than the first quantity value or not, or irrespective of whether the accumulated heat quantity in the synchromesh mechanism is larger than the second quantity value or not. If the dog clutch is in the engaged state in a in a high speed range, rotational speeds of respective rotary members connected to the drive wheels in the first drive-force transmitting path are made high whereby durability of friction members could be reduced due to increase of a difference between an input-side rotational speed and an output-side rotational speed of the first frictional engagement device. However, in the control apparatus according to the third aspect of the invention, when the running speed is in the high speed range, the dog clutch is placed in the released state whereby each of the rotary members in the first drive-force transmitting path is prevented from being rotated at an excessively high speed.

In the control apparatus according to the fourth aspect of the invention, the second speed value is the lower limit value of the running speed range in which the vehicle is inhibited from being switched from the second running mode to the first running mode in which the vehicle is to run with the driving force being transmitted through the gear mechanism along the first drive-force transmitting path, for the purpose of preventing the drive force source from being rotated at an excessively high speed. That is, the dog clutch is placed in the released state when the running speed is in a high speed range in which the dog clutch is not required to be switched from the released state to the engaged state in preparation of switching of the running mode from the second running mode to the first running mode.

In the control apparatus according to the fifth aspect of the invention, the accumulated heat quantity in the synchromesh mechanism is calculated based on the generated heat quantity and the dissipated heat quantity, wherein the generated heat quantity is the predetermined quantity of heat generated in the synchromesh mechanism in process of switching of the dog clutch from the released state to the engaged state, and wherein the dissipated heat quantity is the quantity of heat dissipated from the synchromesh mechanism and is dependent on a length of time for which the dog clutch is held in the engaged state. Thus, when the dog clutch is in the engaged state, the dog clutch is appropriately inhibited from being switched to the released state and is appropriately allowed to be switched to the released state.

BRIEF DESCRIPTION OF THE DRAWINGS

FIG. 4 is a flow chart showing a main part of a control routine executed by the control apparatus, namely, a control routine that is executed for restraining reduction of function of a synchromesh mechanism which is caused by increase of accumulated heat quantity during running of the vehicle in a belt running mode.

DETAILED DESCRIPTION OF PREFERRED EMBODIMENT

Figure 1:
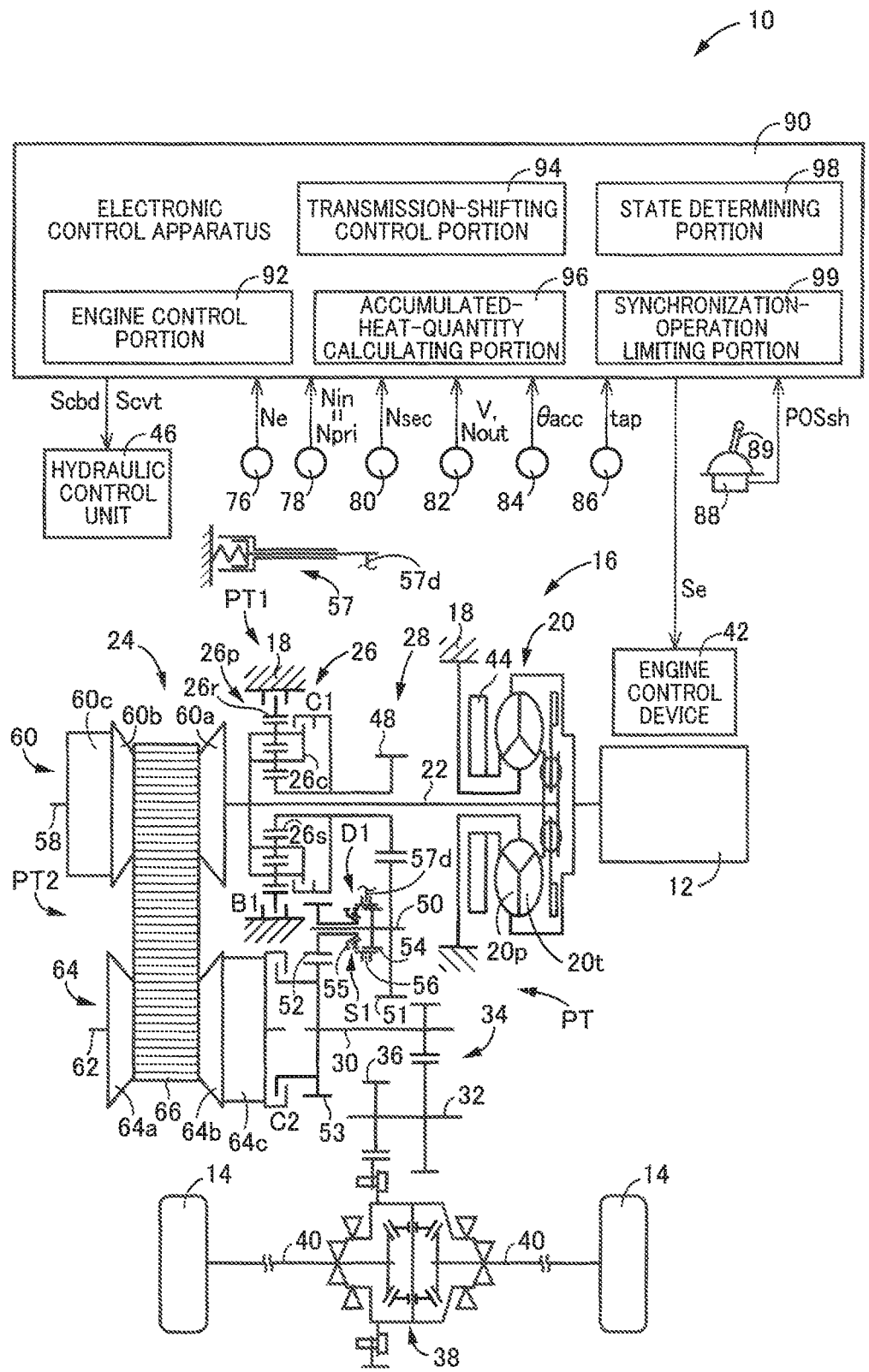
FIG. 1 is a schematic view showing a construction of a vehicle to be controlled by a control apparatus according to the present invention, and major control functions and control portions of the control apparatus.

In the embodiment of the present invention, the continuously-variable transmission mechanism includes a primary pulley, a secondary pulley and a transmission belt that is mounted on or looped over the primary and secondary pulleys. Each of the primary pulley (i.e., input-side pulley) and the secondary pulley (i.e., output-side pulley) includes, for example, a fixed sheave, a movable sheave and a hydraulic actuator, which is configured to apply a thrust for changing a width of an annular groove defined between the fixed and movable sheaves of a corresponding one of the primary and secondary pulleys. A vehicle provided with the above-described drive-force transmitting apparatus includes a hydraulic control unit configured to control pulley hydraulic pressures supplied as working hydraulic pressures to the respective hydraulic actuators, independently of each other. The hydraulic control unit may be configured to control an amount of flow of a working fluid supplied to each of the hydraulic actuators so as to consequently generate the pulley hydraulic pressures, for example. A shifting control operation is performed by the hydraulic control unit to execute a shifting action to establish a target gear ratio while preventing slippage of a transfer element in the continuously-variable transmission mechanism, by controlling the thrust (=pulley hydraulic pressure*pressure receiving area) applied to each of the primary and secondary pulleys. The transfer element, which is looped over the primary and secondary pulleys, may be a compression-type endless annular transmission belt including at least one endless annular hoop and a multiplicity of thick-plate-shaped block elements that are held by the at least one endless annular hoop so as to be arranged in their thickness direction corresponding to a circumferential direction of the transmission belt, along the at least one endless annular hoop, or alternatively, a tension-type belt constituting an endless annular link chain including a plurality of link plates alternately superposed and mutually connected at their end portions through connecting pins. The above-described continuously variable transmission mechanism is a known belt-type continuously-variable transmission, and can be broadly interpreted to conceptually encompass not only the belt-type continuously-variable transmission but also a chain-type continuously-variable transmission.

It is noted that the term "gear ratio" of an apparatus or mechanism such as the drive-force transmitting apparatus and the continuously-variable transmission mechanism is defined as "rotational speed of input-side rotary member/ rotational speed of output-side rotary member". For example, the gear ratio of the above-described continuously-variable transmission mechanism is defines as "rotational speed of the primary pulley/rotational speed of the secondary pulley". Further, the gear ratio of the above-described drive-force transmitting apparatus is defined as "rotational speed of the input rotary member/rotational speed of the output rotary member". A vehicle running speed could be lower as the gear ratio is higher, and could be higher as the gear ratio is lower. A highest gear ratio can be expressed also as a lowest-speed gear ratio.

The above-described drive force source is, for example, an internal combustion engine such as a gasoline engine and a diesel engine generating a drive force by combustion of fuel supplied thereto. The vehicle provided with the drive-force transmitting apparatus may be equipped with, in addition to or in place of a drive force source in the form of the engine, another drive force source in the form of, for example, an electric motor.

Hereinafter, preferred embodiment of the invention will be described in detail with reference to the accompanying drawings.

Embodiment

FIG. 1 is a schematic view showing a construction of a vehicle 10 to be controlled by a control apparatus according to the present invention, and major control functions and control portions of the control apparatus. As shown in FIG. 1, the vehicle 10 is provided with an engine 12 functioning as a drive force source configured to generate a drive force, drive wheels 14 and a vehicle drive-force transmitting apparatus 16 that is provided in drive-force transmitting paths between the engine 12 and the drive wheels 14.

The drive-force transmitting apparatus 16 includes a non-rotary member in the form of a casing 18, a fluid-operated type drive-force transmitting device in the form of a known torque converter 20 that is connected to the engine 12, an input shaft 22 connected to the torque converter 20, a continuously-variable transmission mechanism 24 connected to the input shaft 22, a forward/reverse switching device 26 connected to the input shaft 22, a gear mechanism 28 which is provided in parallel with the continuously-variable transmission mechanism 24 and which is connected to the input shaft 22 via the forward/reverse switching device 26, an output shaft 30 serving as an output rotary member that is common to the continuously-variable transmission mechanism 24 and the gear mechanism 28, a counter shaft 32, a reduction gear device 34 consisting of a pair of mutually meshing gears each of which is connected to a corresponding one of the output shaft 30 and the counter shaft 32 so as to unrotatable relative to the corresponding one of the shafts 30, 32, a gear 36 connected to the counter shaft 32 so as to be unrotatable relative to the counter shaft 32, and a differential gear device 38 connected to the gear 36. The torque converter 20, input shaft 22, continuously-variable transmission mechanism 24, forward/reverse switching device 26, gear mechanism 28, output shaft 30, counter shaft 32, reduction gear device 34, gear 36 and differential gear device 38 are disposed within the casing 18. The drive-force transmitting apparatus 16 further includes right and left axles 40 that are connected to the differential gear device 38. The input shaft 22 serves as an input rotary member to which the drive force of the engine 12 is to be inputted. The output shaft 30 serves as the output rotary member through which the drive force of the engine 12 is to be outputted. It is noted that the above-described drive force is synonymous with a drive torque or a drive power unless otherwise distinguished from them.

In the drive-force transmitting apparatus 16 constructed as described above, the drive force generated by the engine 12 is transmitted to the right and left drive wheels 14, via the torque converter 20, forward/reverse switching device 26, gear mechanism 28, reduction gear device 34, differential gear device 38, axles 40 and other elements, or alternatively, via the torque converter 20, continuously-variable transmission mechanism 24, reduction gear device 34, differential gear device 38, axles 40 and other elements.

As described above, the drive-force transmitting apparatus 16 has the gear mechanism 28 and the continuously-variable transmission mechanism 24 that are provided in parallel with each other in respective drive-force transmitting paths PT between the engine 12 and the drive wheels 14. Specifically, the drive-force transmitting apparatus 16 has the gear mechanism 28 and the continuously-variable transmission mechanism 24 that are provided in parallel with each other in the respective drive-force transmitting paths PT between the input shaft 22 and the output shaft 30. That is, the drive-force transmitting apparatus 16 defines the plurality of drive-force transmitting paths that are parallel with each other between the input shaft 22 and the output shaft 30, such that the drive force of the engine 12 is to be transmitted from the input shaft 22 to the output shaft 30 along a selected one of the drive-force transmitting paths PT. The plurality of drive-force transmitting paths PT consist of a first drive-force transmitting path PT1 constituted mainly by the gear mechanism 28 and a second drive-force transmitting path PT2 constituted mainly by the continuously-variable transmission mechanism 24. The first and second drive-force transmitting paths PT1, PT2 are defined in parallel with each other between the input shaft 22 and the output shaft 30. The first drive-force transmitting path PT1 is a path along which the drive force of the engine 12 is to be transmitted from the input shaft 22 toward the drive wheels 14 through the gear mechanism 28. The second drive-force transmitting path PT2 is a path along which the drive force of the engine 12 is to be transmitted from the input shaft 22 toward the drive wheels 14 through the continuously-variable transmission mechanism 24.

In the drive-force transmitting apparatus 16, the drive force of the engine 12 is transmitted toward the drive wheels 14 through a selected one of the first and second drive-force transmitting paths PT1, PT2, which is selected depending on a running state of the vehicle 10. To this end, the drive-force transmitting apparatus 16 includes a plurality of engagement devices by which the selected one of the first and second drive-force transmitting paths PT1, PT2 is established. The plurality of engagement devices include a first clutch C1, a first brake B1 and a second clutch C2. The first clutch C1, which serves as a first frictional engagement device, is provided in the first drive-force transmitting path PT1 and configured to selectively connect and disconnect the first drive-force transmitting path PT1, such that the first drive-force transmitting path PT1 is established with engagement of the first clutch C1 during forward running of the vehicle 10. The first brake B1, which serves as another first frictional engagement device, is provided in the first drive-force transmitting path PT1 and configured to selectively connect and disconnect the first drive-force transmitting path PT1, such that the first drive-force transmitting path PT1 is established with engagement of the first brake B during reverse running of the vehicle 10. That is, the first drive-force transmitting path PT1 is established with either the first clutch C1 or the first brake B1 being engaged. The second clutch C2, which serves as a second engagement device, is disposed in the second drive-force transmitting path PT2 and configured to selectively connect and disconnect the second drive-force transmitting path PT2, such that the second drive-force transmitting path PT2 is established with engagement of the second clutch C2. That is, the second drive-force transmitting path PT2 is established with the second clutch C2 being engaged. Each of the first clutch C1, first brake B1 and second clutch C2 is a known hydraulically-operated wet-type frictional engagement device that is to be frictionally engaged by operation of a hydraulic actuator. The first clutch C1 as the first frictional engagement device may be referred also to as a gear engagement device for a forward running of the vehicle 10. The second clutch C2 as the second engagement device may be referred also to as a continuously-variable-transmission engagement device. The first brake B1 as the another first frictional engagement device may be referred also to as a gear engagement device for a reverse running of the vehicle 10. As described below, each of the first clutch C1 and the first brake B1 constitutes a part of the forward/reverse switching device 26. Each of the plurality of engagement devices includes a hydraulic actuator to which a control pressure (that is regulated by a hydraulic control unit 46 provided in the vehicle 10) is supplied whereby an operation state of each engagement device is switched between its engaged state and released state.

The engine 12 is provided with an engine control device 42 including an electronic throttle device, a fuel injection device, an ignition device and other devices that are required for controlling an output of the engine 12. In the engine 12, the engine control device 42 is controlled, by an electronic control apparatus 90 (that corresponds to "a control apparatus" recited in the appended claims), based on an operation amount θacc of an accelerator pedal that corresponds to a required drive force of the vehicle 10 required by an operator of the vehicle 10, whereby an engine torque Te as an output of the engine 12 is controlled.

The torque converter 20 is provided with a pump impeller 20p and a turbine impeller 20t that are connected to the engine 12 and the input shaft 22, respectively. The torque converter 20 is a fluid-operated type drive-force transmitting device configured to transmit the drive force of the engine 12 to the input shaft 22. The drive-force transmitting apparatus 16 is provided with a mechanical oil pump 44 connected to the pump impeller 20p. The oil pump 44 is to be driven by the engine 12, to supply a working fluid pressure as its original pressure to the hydraulic control unit (hydraulic control circuit) 46, for performing a shifting control operation in the continuously-variable transmission mechanism 24, generating a belt clamping force in the continuously-variable transmission mechanism 24, and switching the operation state of each of the above-described engagement devices between its engaged state and released state.

The forward/reverse switching device 26 includes a planetary gear device 26p of double-pinion type in addition to the first clutch C1 and the first brake B1. The planetary gear device 26p is a differential mechanism including three rotary elements consisting of an input element in the form of a carrier 26c, an output element in the form of a sun gear 26s and a reaction element in the form of a ring gear 26r. The carrier 26c is connected to the input shaft 22. The ring gear 26r is operatively connected to the casing 18 through the first brake B1. The sun gear 26s is connected to a small-diameter gear 48 that is provided to be coaxial with the input shaft 22 and rotatable relative to the input shaft 22. The carrier 26c and the sun gear 26s are operatively connected to each other through the first clutch C1.

The gear mechanism 28 includes, in addition to the above-described small-diameter gear 48, a gear-mechanism counter shaft 50 and a large-diameter gear 51 which meshes with the small-diameter gear 48 and which is provided to be coaxial with the gear-mechanism counter shaft 50 and unrotatable relative to the gear-mechanism counter shaft 50. The large-diameter gear 51 has a diameter larger than that of the small-diameter gear 48. The gear mechanism 28 further includes an idler gear 52 that is provided to be coaxial with the gear-mechanism counter shaft 50 and rotatable relative to the gear-mechanism counter shaft 50, and an output gear 53 that is provided to be coaxial with the output shaft 30 and unrotatable relative to the output shaft 30. The output gear 53 meshes with the idler gear 52, and has a diameter larger than that of the idler gear 52. Therefore, the gear mechanism 28 provides a gear ratio between the input shaft 22 and the output shaft 30 in the first drive-force transmitting path PT1. That is, the gear mechanism 28 corresponds to a gear mechanism configured to provide at least one gear ratio. The gear mechanism 28 further includes a dog clutch D1 as an engagement device that is disposed on the gear-mechanism counter shaft 50 between the large-diameter gear 51 and the idler gear 52 so as to selectively connect and disconnect a drive-force transmitting path between the two gears 51, 52. The dog clutch D1 is configured to selectively connect and disconnect the first drive-force transmitting path PT1, such that the first drive-force transmitting path PT1 is established with engagement of the dog clutch D1. The dog clutch D1, which is also included in the above-described plurality of engagement devices, serves as an engagement device that cooperates with the first clutch C1 or the first brake B1 to establish the first drive-force transmitting path PT1. That is, the first drive-force transmitting path PT1 is established with both of the dog clutch D1 and the first clutch C1 or both of the dog clutch D1 and the first brake B1 being engaged.

The dog clutch D1 includes: a clutch hub 54, a clutch gear 55 and a cylindrical-shaped sleeve 56. The clutch hub 54 is disposed on the gear-mechanism counter shaft 50 such that the clutch hub 54 is coaxial with the gear-mechanism counter shaft 50 and is unrotatable relative to the gear-mechanism counter shaft 50. The clutch gear 55 is fixed to the idler gear 52, and is located between the idler gear 52 and the clutch hub 54. The sleeve 56 is in splined engagement with the clutch hub 54 so as to be fitted on the clutch hub 54, and is unrotatable relative to the clutch hub 54 about an axis of the gear-mechanism counter shaft 50 and movable relative the clutch hub 54 in a direction parallel with the axis of the gear-mechanism counter shaft 50. In the thus constructed dog clutch D1, the idler gear 52 and the gear-mechanism counter shaft 50 are connected to each other, when the sleeve 56, which is always rotatable integrally with the clutch hub 54, is moved toward the clutch gear 55 to be brought into meshing engagement with the clutch gear 55. The dog clutch D1 is provided with a known synchromesh mechanism S1 for synchronizing rotations of the respective sleeve 56 and clutch gear 55 upon meshing engagement of the sleeve 56 with the clutch gear 55. The operation state of the dog clutch D1 is switched between an engaged state and a released state, with sliding movement of the sleeve 56, which is made by operation of a hydraulic actuator 57 as an actuator provided in the drive-force transmitting apparatus 16, in directions parallel to the axis of the gear-mechanism counter shaft 50. Thus, the dog clutch D1 is a dog clutch provided with the synchromesh mechanism S1, and is to be operated by the hydraulic actuator 57 to selectively connect and disconnect a drive-force transmitting path that corresponds to the first drive-force transmitting path PT1.

The first drive-force transmitting path PT1 is established with both of engagement of the dog clutch D1 and engagement of either one of the first clutch C1 and the first brake B1 which are located to be closer to the input shaft 22 than the dog clutch D1. A forward-running drive-force transmitting path is established by engagement of the first clutch C1, and a reverse-running drive-force transmitting path is established by engagement of the first brake B1. When the first clutch C as well as the dog clutch D1 is engaged, the first drive-force transmitting path PT1 for forward running of the vehicle 10 is established. When the first brake B1 as well as the dog clutch D1 is engaged, the first drive-force transmitting path PT1 for reverse running of the vehicle 10 is established. In the drive-force transmitting apparatus 16, with the first drive-force transmitting path PT1 being established, the drive-force transmitting apparatus 16 is placed in its drive-force transmittable state in which the drive force of the engine 12 is transmittable from the input shaft 22 to the output shaft 30 through the gear mechanism 28. With the first drive-force transmitting path PT1 being cut off by release of both of the first clutch C1 and the first brake B1 or by release of the dog clutch D1, the drive-force transmitting apparatus 16 is placed in its neutral state in which the drive force is not transmittable.

Figure 2:
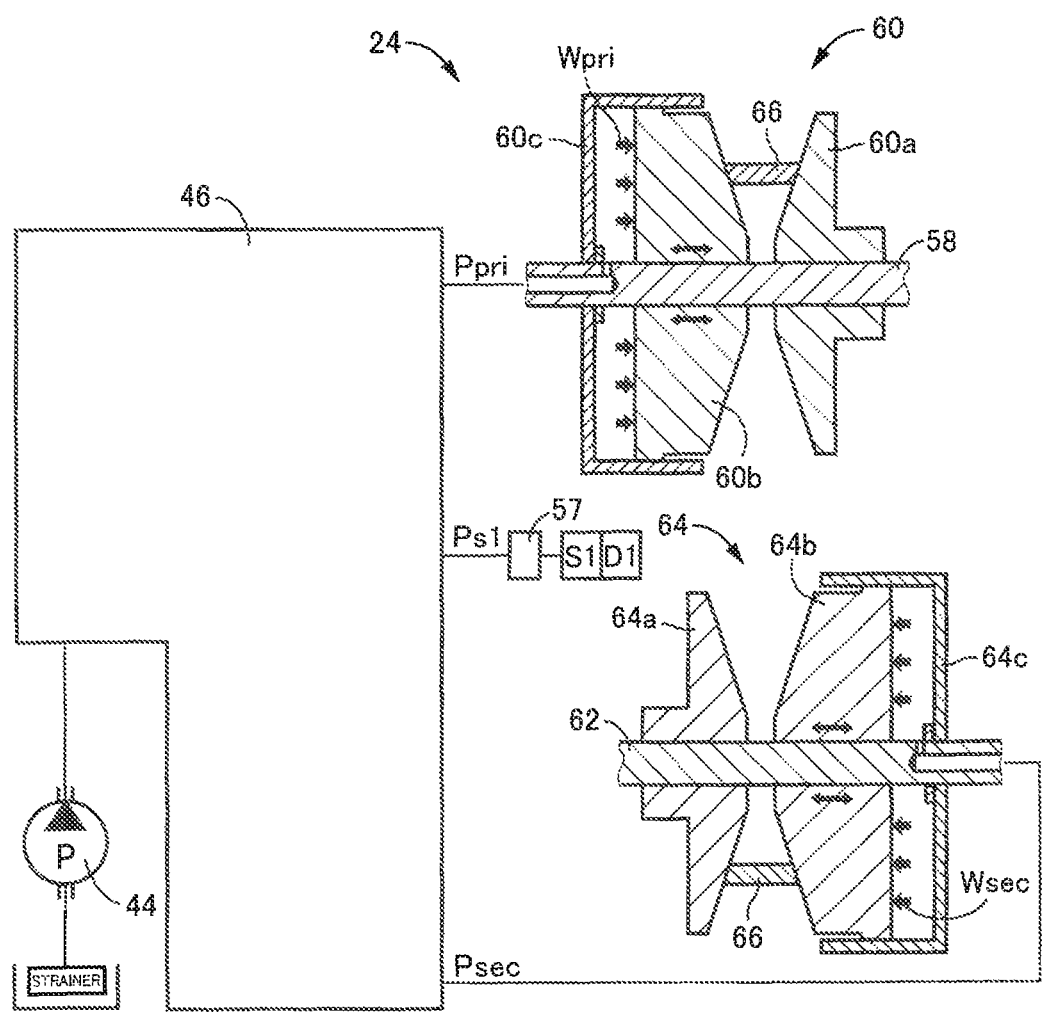
FIG. 2 is view for explaining a construction of a continuously-variable transmission mechanism and a construction of a hydraulic control unit.

FIG. 2 is a view for explaining a construction of the continuously-variable transmission mechanism 24. As shown in FIGS. 1 and 2, the continuously-variable transmission mechanism 24 includes a primary shaft 58 provided to be coaxial with the input shaft 22 and connected integrally to the input shaft 22, a primary pulley 60 connected to the primary shaft 58 and having a variable effective diameter, a secondary shaft 62 provided to be coaxial with the output shaft 30, a secondary pulley 64 connected to the secondary shaft 62 and having a variable effective diameter, and a transfer element in the form of a transmission belt 66 looped over or mounted on the pulleys 60, 64. The continuously-variable transmission mechanism 24 is a known belt-type continuously-variable transmission in which the drive force is transmitted owing to a friction force generated between the transmission belt 66 and each of the pulleys 60, 64, and is configured to transmit the drive force of the engine 12 toward the drive wheels 14. The friction force is synonymous with a clamping force, and is referred also to as a belt clamping force. The belt clamping force corresponds to a belt torque capacity Tcvt that is a torque capacity of the transmission belt 66 in the continuously-variable transmission mechanism 24.

The primary pulley 60 includes a fixed sheave 60a connected to the primary shaft 58, a movable sheave 60b unrotatable about an axis of the primary shaft 58 and axially movable relative to the fixed sheave 60a, and a hydraulic actuator 60c configured to apply a primary thrust Wpri to the movable sheave 60b. The primary thrust Wpri is a thrust (=primary pressure Ppri*pressure receiving area) for changing a width of a V-shaped groove defined between the fixed and movable sheaves 60a, 60b of the primary pulley 60. That is, the primary thrust Wpri is a thrust applied to the primary pulley 60 from the hydraulic actuator 60c, to clamp the transmission belt 66 that is mounted on the primary pulley 60. The primary pressure Ppri is a hydraulic pressure supplied from the hydraulic control unit 46 to the hydraulic actuator 60c, and serves as a pulley hydraulic pressure for generating the primary thrust Wpri. Meanwhile, the secondary pulley 64 includes a fixed sheave 64a connected to the secondary shaft 62, a movable sheave 64b unrotatable about an axis of the secondary shaft 62 and axially movable relative to the fixed sheave 64a, and a secondary hydraulic actuator 64c configured to apply a secondary thrust Wsec to the movable sheave 64b. The secondary thrust Wsec is a thrust (=secondary pressure Psec*s pressure receiving area) for changing a width of a V-shaped groove defined between the fixed and movable sheaves 64a, 64b of the secondary pulley 64. That is, the secondary thrust Wsec is a thrust applied to the secondary pulley 64 from the secondary hydraulic actuator 64c, to clamp the transmission belt 66 that is mounted on the secondary pulley 64. The secondary pressure Psec is a hydraulic pressure supplied from the hydraulic control unit 46 to the secondary hydraulic actuator 64c, and serves as a pulley hydraulic pressure for generating the secondary thrust Wsec.

In the continuously-variable transmission mechanism 24, the primary and secondary pressures Ppri, Psec are controlled by the hydraulic control unit 46 that is controlled by the electronic control apparatus 90, whereby the primary and secondary thrusts Wpri, Wsec are respectively controlled. With the primary and secondary thrusts Wpri, Wsec being controlled, the widths of the V-shaped grooves of the respective pulleys 60, 64 are controlled to be changeable whereby a belt winding diameter (effective diameter) of each of the pulleys 60, 64 is changeable and accordingly a gear ratio γcvt (=primary rotational speed Npri/secondary rotational speed Nsec) of the continuously-variable transmission mechanism 24 is changeable. Further, with the primary and secondary thrusts Wpri, Wsec being controlled, the belt clamping force is controlled such that slipping of the transmission belt 66 is not caused. That is, with the primary and secondary thrusts Wpri, Wsec being controlled, the gear ratio γcvt of the continuously-variable transmission mechanism 24 is controlled to a target gear ratio γcvttgt while the transmission belt 66 is prevented from being slipped. It is noted that the primary rotational speed Npri represents a rotational speed of the primary shaft 58 and that the secondary rotational speed Nsec represents a rotational speed of the secondary shaft 62.

In the continuously-variable transmission mechanism 24, when the primary pressure Ppri is increased, the width of the V-shaped groove of the primary pulley 60 is reduced whereby the gear ratio γcvt is reduced. The reduction of the gear ratio γcvt corresponds to a shift-up action performed in the continuously-variable transmission mechanism 24. In the continuously-variable transmission mechanism 24, the lowest gear ratio γmin is provided with the width of the V-shaped groove of the primary pulley 60 being minimized. Within a range of the gear ratio γcvt that can be provided by the continuously-variable transmission mechanism 24, the lowest gear ratio gear ratio γmin is a value of the gear ratio γcvt which makes it possible to maximize the running speed of the vehicle 10. Further, in the continuously-variable transmission mechanism 24, when the primary pressure Ppri is reduced, the width of the V-shaped groove of the primary pulley 60 is increased whereby the gear ratio γcvt is increased. The increase of the gear ratio γcvt corresponds to a shift-down action performed in the continuously-variable transmission mechanism 24. In the continuously-variable transmission mechanism 24, the highest gear ratio γmax is provided with the width of the V-shaped groove of the primary pulley 60 being maximized. Within the range of the gear ratio γcvt that can be provided by the continuously-variable transmission mechanism 24, the highest gear ratio gear ratio γmax is a value of the gear ratio γcvt which makes it possible to minimize the running speed of the vehicle 10. In the continuously-variable transmission mechanism 24, the belt slippage is prevented by the primary thrust Wpri and the secondary thrust Wsec, and the target gear ratio γcvttgt is established by a combination of the primary thrust Wpri and the secondary thrust Wsec, rather than by only one of the primary thrust Wpri and the secondary thrust Wsec. The gear ratio γcvt of the continuously-variable transmission mechanism 24 is changed with change of a thrust ratio τ (=Wsec/Wpri) which is a ratio of the secondary thrust Wsec to the primary thrust Wpri and which is dependent on a relationship between the primary pressure Ppri and the secondary pressure Psec. For example, the gear ratio γcvt is increased with increase of the thrust ratio τ, namely, a shift-down action of the continuously-variable transmission mechanism 24 is caused with increase of the thrust ratio τ.

The output shaft 30 is provided to be coaxial with the secondary shaft 62 and rotatable relative to the secondary shaft 62. The second clutch C2 is provided in a drive-force transmitting path section (that constitutes a part of the above-described second drive-force transmitting path PT2) between the secondary pulley 64 and the output shaft 30. The second drive-force transmitting path PT2 is established with engagement of the second clutch C2. In the drive-force transmitting apparatus 16, with the second drive-force transmitting path PT2 being established, the drive-force transmitting apparatus 16 is placed in its drive-force transmittable state in which the drive force of the engine 12 is transmittable from the input shaft 22 to the output shaft 30 through the continuously-variable transmission mechanism 24. With the second drive-force transmitting path PT2 being cut off by release of the second clutch C2, the drive-force transmitting apparatus 16 is placed in its neutral state in which the drive force is not transmittable. The gear ratio γcvt of the continuously-variable transmission mechanism 24 corresponds to a gear ratio established in the second drive-force transmitting path PT2.

In the drive-force transmitting apparatus 16, a gear ratio EL of the gear mechanism 28, which is a gear ratio γgear (=input-shaft rotational speed Nin/output-shaft rotational speed Nout) provided in the first drive-force transmitting path PT1, is higher than the above-described highest gear ratio γmax of the continuously-variable transmission mechanism 24 which is the highest gear ratio provided in the second drive-force transmitting path PT2. That is, the gear ratio EL is a value that makes it possible to reduce the running speed of the vehicle 10 more than the highest gear ratio γmax. The gear ratio EL of the gear mechanism 28 corresponds to a first-speed gear ratio γ1 in the drive-force transmitting apparatus 16. The highest gear ratio γmax of the continuously-variable transmission mechanism 24 corresponds to a second-speed gear ratio γ2 in the drive-force transmitting apparatus 16. Thus, any gear ratio provided in the second drive-force transmitting path PT2 is lower than the gear ratio provided in the first drive-force transmitting path PT1. It is noted that the input-shaft rotational speed Nin represents a rotational speed of the input shaft 22 and that the output-shaft rotational speed Nout represents a rotational speed of the output shaft 30.

The vehicle 10 can run in a selected one of the gear running mode and the belt running mode. The gear running mode is a running mode in which the vehicle 10 can run with the drive force being transmitted along the first drive-force transmitting path PT1 that is established in the drive-force transmitting apparatus 16. That is, the gear running mode is a first running mode in which the vehicle 10 can run with the drive force of the engine 12 transmitted along the first drive-force transmitting path PT1. The belt running mode is a running mode in which the vehicle 10 can run with the drive force being transmitted along the second drive-force transmitting path PT2 that is established in the drive-force transmitting apparatus 16. That is, the belt running mode is a second running mode in which the vehicle 10 can run with the drive force of the engine 12 transmitted along the second drive-force transmitting path PT2. When forward running of the vehicle 10 is to be made in the gear running mode, the first clutch C1 and the dog clutch D1 are engaged while the second clutch C2 and the first brake B1 are released. When reverse running of the vehicle 10 is to be made in the gear running mode, the first brake B1 and the dog clutch D1 are engaged while the second clutch C2 and the first clutch C1 are released. When running of the vehicle 10 to be made in the belt running mode, the second clutch C2 is engaged while the first clutch C1 and the first brake B1 are released. In the belt running mode, forward running of the vehicle 10 can be made.

The gear running mode is selected to be established when the vehicle 10 runs at a running speed within a relative low speed range or when the vehicle 10 is stopped. The belt running mode is selected to be established when the vehicle 10 runs at a running speed within a relatively high speed range including a middle speed range as well as a high speed range. When the belt running mode is established in the middle speed range, the dog clutch D1 is engaged. When the belt running mode is established in the high speed range, the dog clutch D1 is released, for example, for the purpose of avoiding drag of the gear mechanism 28 and other elements during running of the vehicle 10 in the belt running mode and preventing gears of the gear mechanism 28 and components (such as pinion gears) of the planetary gear device 26p from being rotated at high speeds. With the gears of the gear mechanism 28 being prevented from being rotated at high speeds, for example, a difference between an input-side rotational speed and an output-side rotational speed of the first clutch C1 is prevented from being excessively increased whereby durability of friction members of the first clutch C1 is improved.

Figure 3:
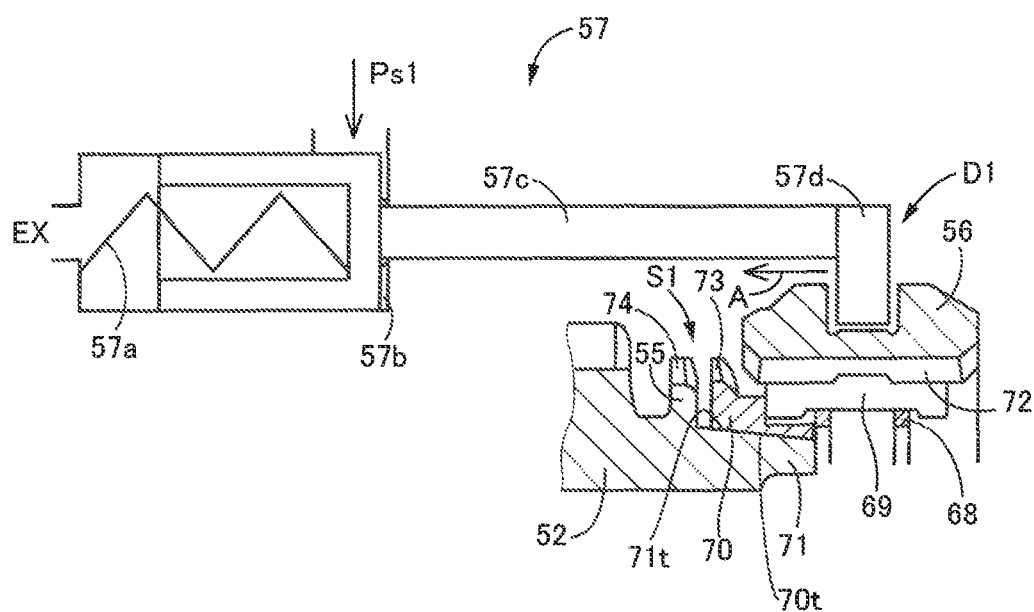
FIG. 3 is a view for explaining a construction and a switching operation of a dog clutch and showing a released state of the dog clutch.

FIG. 3 is a view for explaining a construction of the dog clutch D1 and a switching of the dog clutch D1 between the engaged state and the released state. FIG. 3 shows the released state of dog clutch D1. As shown in FIG. 3, the synchromesh mechanism S1 includes: key springs 68; a shifting key 69 engaged with the sleeve 56 by the key springs 68; a synchronizer ring 70 rotatable together with the shifting key 69 with a play between the synchronizer ring 70 and the shifting key 69; and a conical portion 71 provided in the clutch gear 55. The sleeve 56 has spline teeth 72 which are provided in its inner circumferential surface and which are in splined engagement with the clutch hub 54. With the sleeve 56 being moved from a releasing position shown in FIG. 3 toward the clutch gear 55 in a direction indicated by arrow A in FIG. 3, the synchronizer ring 70 is pressed onto the conical portion 71 through the shifting key 69, so that the drive force is transmitted to the clutch gear 55 owing to a friction force generated between a tapered inner circumferential surface 70t of the synchronizer ring 70 and a tapered outer circumferential surface 71t of the conical portion 71 that are brought into close contact with each other. Then, with the sleeve 56 being further moved toward the clutch gear 55 in a direction away from a releasing side of the synchronizing position that is opposite to the engaging side of the synchronizing position in the axial direction, the sleeve 56 is positioned in an engaging position whereby the spline teeth 72 are brought into meshing engagements with spline teeth 73 provided in the synchronizer ring 70 and also with spline teeth 74 provided in the clutch gear 55, so that the clutch hub 54 and the clutch gear 55 are integrally connected to each other and a drive-force transmitting path (corresponding to the first drive-force transmitting path PT1) is established between the forward/reverse switching device 26 and the output shaft 30. The above-described releasing position is a position of the sleeve 56 by which the dog clutch D is placed in its released state. The above-described engaging position is a position of the sleeve 56 by which the dog clutch D1 is placed in its engaged state.

The hydraulic actuator 57 includes a return spring 57a, a fluid chamber 57b, a fork shaft 57c and a shift fork 57d. In the dog clutch D1, a pressing force, which is based on a biasing force of the return spring 57a of the hydraulic actuator 57, is constantly applied to the sleeve 56 through the fork shaft 57c and the shift fork 57d, and constantly forces the sleeve 56 toward its releasing position (see FIG. 3). Meanwhile, a pressing force, which is based on a synchronization control pressure Ps1 regulated by the hydraulic control unit 46 and supplied to the fluid chamber 57b, acts against the biasing force of the return spring 57a, and serves as an engaging force that acts on the sleeve 56 through the fork shaft 57c and the shift fork 57d so as to cause the sleeve 56 to be moved toward its engaging position against the above-described pressing force based on the biasing force of the return spring 57a. Therefore, when the synchronization control pressure Ps1 supplied to the fluid chamber 57b is made higher than a given pressure value, the sleeve 56 is moved to the engaging position. The given pressure value corresponds to a lower limit of a predetermined range of the synchronization control pressure Ps1 which is required to move the sleeve 56 to the engaging position and which is obtained by experimentation or determined by an appropriate design theory. It is noted that the above-described releasing position is a position in which the sleeve 56 is to be positioned to place the dog clutch D1 in the released state, and that the above-described engaging position is a position in which the sleeve 56 is to be positioned to place the dog clutch D1 in the engaged state.

The vehicle 10 is provided with the electronic control apparatus 90 as a controller including the control apparatus constructed according to present invention. For example, the electronic control apparatus 90 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 90 is configured to perform, for example, an engine control operation for controlling an output of the engine 12, a shifting control operation and a belt-clamping-force control operation for the continuously-variable transmission mechanism 24, and a hydraulic-pressure control operation for switching the operation state of each of the plurality of engagement devices (C1, B1, C2, D1). The electronic control apparatus 90 may be constituted by two or more control units exclusively assigned to perform different control operations such as the engine control operation and the hydraulic-pressure control operation.

The electronic control apparatus 90 receives various input signals based on values detected by respective sensors provided in the vehicle 10. Specifically, the electronic control apparatus 90 receives: an output signal of an engine speed sensor 76 indicative of an engine rotational speed Ne which is a rotational speed of the engine 12; an output signal of a primary speed sensor 78 indicative of a primary rotational speed Npri which is a rotational speed of the primary shaft 58 which is equivalent to an input-shaft rotational speed Nin; an output signal of a secondary speed sensor 80 indicative of a secondary rotational speed Nsec which is a rotational speed of the secondary shaft 62; an output signal of an output speed sensor 82 indicative of an output-shaft rotational speed Nout which is a rotational speed of the output shaft 30 and which corresponds to the running speed V of the vehicle 10; an output signal of an accelerator-operation amount sensor 84 indicative of an accelerator operation amount θacc which represents an amount of accelerating operation made by a vehicle operator; an output signal of a throttle-opening degree sensor 86 indicative of the throttle opening degree tap; and an output signal of a shift position sensor 88 indicative of an operation position POSsh of a manually-operated shifting device in the form of a shift lever 89 provided in the vehicle 10. Further, the electronic control apparatus 90 generates various output signals which are supplied to various devices such as the engine control device 42 and the hydraulic control unit 46 and which include an engine-control command signal Se for controlling the engine 12, a hydraulic control command signal Scvt for performing hydraulic controls such as controls of the shifting action and the belt clamping force of the continuously-variable transmission mechanism 24, and a hydraulic-control command signal Scbd for performing hydraulic controls such as controls of operation states of the plurality of engagement devices. It is noted that the input-shaft rotational speed Nin (=primary rotational speed Npri) is equivalent to a rotational speed of the turbine impeller 20t of the of the torque converter 20. It is also noted that the primary rotational speed Npri is equivalent to a rotational speed of the primary pulley 60 and that the secondary rotational speed Nsec is equivalent to a rotational speed of the secondary pulley 64. Further, the electronic control apparatus 90 calculates an actual gear ratio γcvt (=Npri/Nsec) that is an actual value of the gear ratio γcvt of the continuously-variable transmission mechanism 24, based on the primary rotational speed Npri and the secondary rotational speed Nsec.

The shift lever 89 is operable to be placed in a selected one of a plurality of operation positions POSsh that consist of, for example, a parking position P, a reverse position R, a neutral position N and a drive position D. With the shift lever 89 being placed in the parking position P, the drive-force transmitting apparatus 16 is placed in its parking position in which the drive-force transmitting apparatus 16 is placed in its neutral state and rotation of the output shaft 30 is mechanically inhibited (locked). The drive-force transmitting apparatus 16 is placed in the neutral state, for example, by releasing all of the first clutch C1, first brake B1 and second clutch C2. That is, the neutral state is a state of the drive-force transmitting apparatus 16 in which neither the first drive-force transmitting path PT1 nor the second drive-force transmitting path PT2 is established. With the shift lever 89 being placed in the reverse position R, the drive-force transmitting apparatus 16 is placed in its reverse drive position for enabling the reverse running of the vehicle 10 in the gear running mode. With the shift lever 89 being placed in the neutral position N, the drive-force transmitting apparatus 16 is placed in its neutral position in which the drive-force transmitting apparatus 16 is placed in its neutral state. With the shift lever 89 being placed in the drive position D, the drive-force transmitting apparatus 16 is placed in its forward drive position for enabling the forward running of the vehicle 10 in the gear running mode, or enabling the forward running of the vehicle 10 in the belt running mode with execution of an automatic shifting control of the continuously-variable transmission mechanism 24.

For performing various control operations in the vehicle 10, the electronic control apparatus 90 includes an engine control means or portion in the form of an engine control portion 92 and a transmission shifting control means or portion in the form of a transmission-shifting control portion 94.

The engine control portion 92 calculates a required drive force Fdem, for example, by applying the accelerator operation amount θacc and the running velocity V to a predetermined or stored relationship (e.g., drive force map) that is obtained by experimentation or determined by an appropriate design theory. The engine control portion 92 sets a target engine torque Tet that ensures the required drive force Fdem, and outputs the engine-control command signal Se for controlling the engine 12 so as to obtain the target engine torque Tetgt. The outputted engine-control command signal Se is supplied to the engine control device 42.

When the operation position POSsh of the shift lever 89 is the parking position P or the neutral position N during stop of the vehicle 10, the transmission-shifting control portion 94 supplies, to the hydraulic control unit 46, the hydraulic-control command signal Scbd requesting engagement of the dog clutch D1, in preparation of transition to the gear running mode. When the operation position POSsh is switched from the parking position P or the neutral position N to the drive position D during stop of the vehicle 10, the transmission-shifting control portion 94 supplies, to the hydraulic control unit 46, the hydraulic-control command signal Scbd requesting engagement of the first clutch C1, whereby the gear running mode is established to enable forward running of the vehicle 10. When the operation position POSsh is switched from the parking position P or the neutral position N to the reverse position R during stop of the vehicle 10, the transmission-shifting control portion 94 supplies, to the hydraulic control unit 46, the hydraulic-control command signal Scbd requesting engagement of the first brake B1, whereby the gear running mode is established to enable reverse running of the vehicle 10.

When the operation position POSsh is the drive position D, the transmission-shifting control portion 94 executes a switching control operation for switching the running mode between the gear running mode and the belt running mode. Specifically, the transmission-shifting control portion 94 determines whether shifting from one of first and second speed positions to the other is to be executed or not, by applying the running speed V and the accelerator operation amount θacc to a stepped shifting map in which a shift-up line, a shift-down line and hysteresis between the shift-up line and the shift-down line are defined. The first speed position corresponds to the above-described gear ratio EL provided in the gear mechanism 28 by which the drive force is to be transmitted along the first drive-force transmitting path PT1 during the gear running mode. The second speed position corresponds to the above-described highest gear ratio γmax that is the highest one of the gear ratios (or that is a maximum value within a given range of a continuously-variable gear ratio) provided in the continuously-variable transmission mechanism 24 by which the drive force is to be transmitted along the second drive-force transmitting path PT2 during the belt running mode. Then, when determining that the shifting is to be executed, the transmission-shifting control portion 94 switches the running mode from one of the gear running mode and the belt running mode to the other, so as to execute shifting up or down from one of the first and second speed positions to the other.

When determining that the running mode is to be switched from the gear running mode to the belt running mode so as to execute the shifting up from the first speed position to the second speed position during running in the gear running mode, the transmission-shifting control portion 94 supplies, to the hydraulic control unit 46, the hydraulic-control command signal Scbd requesting releasing and engaging actions of the respective first and second clutches C1, C2, so as to perform a so-called "clutch to clutch" shifting operation while the dog clutch D1 is in the engaged state. As a result of the shifting up from the first speed position to the second speed position, the second drive-force transmitting path PT2 is established in place of the first drive-force transmitting path PT1 in the drive-force transmitting apparatus 16. Thus, the transmission-shifting control portion 94 executes a stepped shifting control to release and engage the first and second clutches C1, C2, respectively, so as to cause the drive-force transmitting apparatus 16 to execute the shift-up action by which the selected running mode is switched from the gear running mode in which the first drive-force transmitting path PT1 is established to the belt running mode in which the second drive-force transmitting path PT2 is established. In the following description relating to the present embodiment, the shift-up action, which is executed by the drive-force transmitting apparatus 16 to switch the selected running mode from the gear running mode to the belt running mode, will be referred to as a stepped shift-up action.

When determining that the running mode is to be switched from the belt running mode to the gear running mode so as to execute the shifting down from the second speed position to the first speed position during running in the belt running mode, the transmission-shifting control portion 94 supplies, to the hydraulic control unit 46, the hydraulic-control command signal Scbd requesting releasing and engaging actions of the respective second and first clutches C2, C1, so as to perform the clutch to clutch shifting operation while the dog clutch D1 is in the engaged state. As a result of the shifting down from the second speed position to the first speed position, the first drive-force transmitting path PT1 is established in place of the second drive-force transmitting path PT2 in the drive-force transmitting apparatus 16. Thus, the transmission-shifting control portion 94 executes a stepped shifting control to engage and release the first and second clutches C1, C2, respectively, so as to cause the drive-force transmitting apparatus 16 to execute the shift-down action by which the selected running mode is switched from the belt running mode in which the second drive-force transmitting path PT2 is established to the gear running mode in which the first drive-force transmitting path PT1 is established. In the following description relating to the present embodiment, the shift-down action, which is executed by the drive-force transmitting apparatus 16 to switch the selected running mode from the belt running mode to the gear running mode, will be referred to as a stepped shift-down action.

In the switching control operation for switching the running mode between the gear running mode and the belt running mode, the switching between the first and second drive-force transmitting paths PT1, PT2 is made by only the above-described clutch to clutch shifting operation for making a torque transfer with the dog clutch D1 being in its engaged state, so that the switching control operation is performed with a shifting shock being restrained. In the following description regarding the present invention, the control executed to switch between the gear running mode and the belt running mode will be referred to as a clutch-to-clutch shifting control, i.e., C-to-C shifting control.

The transmission-shifting control portion 94 supplies, to the hydraulic control unit 46, the hydraulic-control command signal Scbd requesting engagement of the dog clutch D1, for example, after starting of the engine 12 has been completed. Further, the transmission-shifting control portion 94 supplies, to the hydraulic control unit 46, the hydraulic-control command signal Scbd requesting release of the dog clutch D when the vehicle running speed V is increased in the belt running mode after execution of the stepped shift-up action. Further, when the running speed V is reduced after the dog clutch D has been released in the belt running mode, the transmission-shifting control portion 94 supplies, to the hydraulic control unit 46, the hydraulic-control command signal Scbd requesting engagement of the dog clutch D1. That is, during running of the vehicle 10 in the belt running mode, the transmission-shifting control portion 94 places the dog clutch D1 in the released state when the running speed is higher than a first speed value V1, and places the dog clutch D1 in the engaged state when the running speed is not higher than the first speed value V1. The first speed value V1 is an upper limit value of a predetermined low or middle running speed range in which it is considered appropriate that the dog clutch D1 is placed in the engaged state, for example, in preparation of execution of the stepped shift-down action. With the first speed value V1 being set to such a value, it is possible to prevent drag of the gear mechanism 28 and other elements and prevent components of the gear mechanism 28 and the planetary gear device 26p from being rotated at high speeds, during running of the vehicle 10 at a speed in a high running speed range in the belt running mode.

The operation state of the dog clutch D1 will be described in detail. The operation state of the dog clutch D1 is roughly classified into three states consisting of the released state, engaged process state and engaged state. A position of the shift fork 57d and the fork shaft 57c corresponding to the position of the sleeve 56 in an axial direction of the gear-mechanism counter shaft 50 is represented by a digitalized value in the form of a synchronization position. The synchronization position is zero when the sleeve 56 is positioned in the releasing position, and is a maximum value (>0) when the sleeve 56 is positioned in the engaging position. The released state of the dog clutch D1 is a state in which the synchronization control pressure Ps1 is made zero whereby the value of the synchronization position is made zero that corresponds to the releasing position, namely, a state in which the dog clutch D1 is fully released. In the following description relating to the present embodiment, the released state of the dog clutch D1 will be referred also to as synchronization OFF. The engaged process state of the dog clutch D1 is a state in which the dog clutch D1 is in process of being switched from the released state to the engaged state, namely, is a state in which a synchronous-engagement process control is being executed. In execution of the synchronous-engagement process control, the synchronization control pressure Ps1 is raised, and the sleeve 56 is moved such that the value of the synchronization position corresponds to a certain value required for the synchronization that is to be made by the synchromesh mechanism S1. The synchronization that is to be made by the synchromesh mechanism S1 is a synchronization between a synchronous input rotational speed (that is a rotational speed of the gear-mechanism counter shaft 50 as the input-side rotational speed of the dog clutch D1) and a synchronous output rotational speed (that is a rotational speed of the idler gear 52 as the output-side rotational speed of the dog clutch D1). That is, the synchronization corresponds to a state in which a synchronization rotational speed difference, which is a rotational speed difference between the synchronous input rotational speed and the synchronous output rotational speed, is zero. At a synchronizing step of the synchromesh mechanism S1, the synchronous input rotational speed and the synchronous output rotational speed are synchronized with each other, owing to the friction force generated between the tapered inner circumferential surface 70t of the synchronizer ring 70 and the tapered outer circumferential surface 71t of the conical portion 71 that are brought into close contact with each other. The engaged state of the dog clutch D1 is a state in which the meshing engagements of the spline teeth 72 and the spline teeth 74 are completed and the position of the sleeve 56 is located in the engaging position with the value of the synchronization position being maximized, so that the dog clutch D1 is fully engaged. In the following description relating to the present embodiment, the engaged state of the dog clutch D1 will be referred also to as synchronization ON.

For executing a shifting action in the continuously-variable transmission mechanism 24 during the belt running mode, the transmission-shifting control portion 94 supplies, to the hydraulic control unit 46, the hydraulic-control command signal Scvt for controlling the primary pressure Ppri and the secondary pressure Psec such that the target gear ratio γcvttgt is established in the continuously-variable transmission mechanism 24 while the belt slippage is not caused in the continuously-variable transmission mechanism 24.

Specifically, the transmission-shifting control portion 94 calculates a target primary rotational speed Npritgt by applying the accelerator operation amount θacc and the vehicle running speed V into a predetermined relationship in the form of a CVT shifting map. Then, the transmission-shifting control portion 94 calculates the target gear ratio γcvttgt (=Npritgt/Nsec) based on the target primary rotational speed Npritgt. Further, the transmission-shifting control portion 94 calculates an estimated value of the engine torque Te, for example, by applying the throttle opening degree tap and the engine rotational speed Ne to a predetermined relationship such as an engine torque map. Then, the transmission-shifting control portion 94 calculates a turbine torque Tt, based on the estimated value of the engine torque Te and a predetermined relationship such as characteristic of the torque converter 20. The transmission-shifting control portion 94 calculates a thrust ratio τ for establishing the target gear ratio γcvttgt, by applying the target gear ratio γcvttgt and the turbine torque Tt to a predetermined relationship such as a thrust ratio map. The transmission-shifting control portion 94 calculates a target primary thrust Wpritgt and a target secondary thrust Wsectgt that cooperate with each other to establish the thrust ratio τ. The transmission-shifting control portion 94 converts the target primary thrust Wpritgt and the target secondary thrust Wsectgt into a target primary pressure Ppritgt (=Wpritgt/pressure receiving area) and a target secondary pressure Psectgt (=Wsectgt/pressure receiving area), respectively. The transmission-shifting control portion 94 supplies, to the hydraulic control unit 46, the hydraulic-control command signal Scvt by which the primary pressure Ppri and the secondary pressure Psec are controlled to the target primary pressure Ppritgt and the target secondary pressure Psectgt, respectively. In the above description relating to the shifting control of the continuously-variable transmission mechanism 24, the thrusts, which are required for enabling the gear ratio γcvt to be held at the target gear ratio γcvttgt, have been discussed for the convenience of description. In process of a shifting action executed in the continuously-variable transmission mechanism 24, actually, thrusts required for executing a desired shift-up action or shift-down action are added to the thrusts required for enabling the gear ratio γcvt to be held at the target gear ratio γcvttgt.

During running of the vehicle 10 in the belt running mode, if the running speed V remains in the vicinity of the first speed value V1, the switching of the dog clutch D1 between the engaged state and the released state could be repeated in a short period. During process of the switching of the dog clutch D1 from the released state to the engaged state, heat is likely to be generated in a synchro-carbon portion that constitutes the mutually-contacted surfaces, i.e., the tapered inner circumferential surface 70$t$ of the synchronizer ring 70 and the tapered outer circumferential surface 71$t$ of the conical portion 71 that are brought into close contact with each other. The generated heat is dissipated from the synchro-carbon portion when the dog clutch D1 is placed in the engaged state. However, since a certain length of time is required to reduce the accumulated heat quantity to zero by the heat dissipation, the accumulated heat quantity in the synchro-carbon portion is increased when the synchronous-engagement process control is executed before the heat quantity is zeroed. Therefore, if the switching of the dog clutch D1 between the engaged state and the released state is repeated in a short period, a large quantity of heat would be accumulated in the synchro-carbon portion. The largely accumulated quantity of heat in the synchro-carbon portion is likely to cause reduction of a friction generated between the synchro-carbon portion, due to a temporary reduction of a coefficient of the friction and a deterioration of friction members constituting the contacted surfaces, so that there is a risk of reduction of function of the synchromesh mechanism S1, which is to synchronize rotational speeds.

In view of the above-described issue, for the purpose of protecting the synchromesh mechanism S1, it might be possible to inhibit the dog clutch D1 from being placed in the engaged state, namely, inhibit the synchronization ON, so as to restrain further heat generation in the synchro-carbon portion, when the accumulated heat quantity in the synchro-carbon portion is increased to a certain high quantity value during running of the vehicle 10 in the belt running mode. However, the stepped shift-down action cannot be executed when the synchronization ON is inhibited. For example, it is not possible to execute a so-called "kickdown" to the gear ratio EL of the gear mechanism 28, which is a kind of the stepped shift-down action that is to be executed in response to operation of a kickdown switch that is provided to detect further depression of the accelerator pedal at full throttle, or which is a kind of the stepped shift-down action that is to be executed with the accelerator operation amount θacc being maximized or almost maximized. Thus, consequently, there is a risk that the required drive force Fdem could not be obtained.

In the present embodiment, for protecting the synchromesh mechanism S1, the electronic control apparatus 90 is configured, when the accumulated heat quantity in the synchro-carbon portion increased to a certain high quantity value during running of the vehicle 10 in the belt running mode, to inhibit the dog clutch D1 from being placed in the released state, namely, inhibit the synchronization OFF, so as to restrain further heat generation in the synchro-carbon portion. With the synchronization OFF being inhibited in the belt running mode, the engaged state of the dog clutch D1 is maintained whereby the accumulated heat is dissipated from the synchro-carbon portion.

The electronic control apparatus 90 further includes an accumulated-heat-quantity calculating means or portion in the form of a accumulated-heat-quantity calculating portion 96, a state determining means or portion in the form of a state determining portion 98 and a synchronization-operation limiting means or portion in the form of a synchronization-operation limiting portion 99, for realizing function of inhibiting the synchronization OFF during the running in the belt running mode, as described above.

The accumulated-heat-quantity calculating portion 96 is configured, when the dog clutch D1 is in the engaged state during the running in the belt running mode, to calculate the accumulated heat quantity Qs1 in the synchromesh mechanism S1, i.e., the calculate the accumulated heat quantity Qs1 in the synchro-carbon portion. The accumulated-heat-quantity calculating portion 96 calculates the accumulated heat quantity Qs1 (=Qoffon+Qon) [J] in the synchromesh mechanism S1, for example, based on a generated heat quantity Qoffon (>0) [J] and a dissipated heat quantity Qon (<0) [J]. The generated heat quantity Qoffon is a predetermined quantity of heat generated in the synchromesh mechanism S in process of switching of the dog clutch D1 from the released state to the engaged state. The dissipated heat quantity Qon is a quantity of heat dissipated from the synchromesh mechanism S1 and is dependent on a length of time for which the dog clutch D1 has been held in the engaged state. Namely, the dissipated heat quantity Qon is increased with increase of the length of time for which the dog clutch D1 has been held in the engaged state.

When the dog clutch D1 is in the engaged state during the running in the belt running mode, the state determining portion 98 determines whether the accumulated heat quantity Qs1 calculated by the accumulated-heat-quantity calculating portion 96 is larger than a first quantity value A or not. This first quantity value A is, for example, a threshold value for determining that the synchro-carbon portion is in a highly heat accumulated state or mode in which the accumulated heat quantity Qs1 in the synchro-carbon portion is high. This first quantity value A may be, for example, an upper limit value of a predetermined allowable range of the accumulated heat quantity Qs1 in which the function of the synchromesh mechanism S1 is unlikely to be reduced. However, it is preferable that the first quantity value A is set to a value obtained by multiplying the above-described upper limit value by a predetermined safety factor SF (0<SF<1), in view of an error of calculation of the accumulated heat quantity Qs1 and/or more heat generation in the synchro-carbon portion in case in which the synchronization OFF is not inhibited.

In a case in which it is determined by the state determining portion 98 that the accumulated heat quantity Qs1 in the synchromesh mechanism S1 is larger than the first quantity value A, when the dog clutch D1 is in the engaged state during the running in the belt running mode, the synchronization-operation limiting portion 99 outputs a synchronization-OFF inhibiting command which inhibits the dog clutch D1 from being placed in the released state and which is supplied to the transmission-shifting control portion 94. On the other hand, in a case in which it is determined by the state determining portion 98 that the accumulated heat quantity Qs1 in the synchromesh mechanism S1 is not larger than the first quantity value A, when the dog clutch D1 is in the engaged state during the running in the belt running mode, the synchronization-operation limiting portion 99 outputs a synchronization-OFF allowing command which allows the dog clutch D1 to be placed in the released state and which is supplied to the transmission-shifting control portion 94.

When the dog clutch D1 is switched to the released state by allowance of the placement of the dog clutch D1 into the released state after inhibition of the placement of the dog clutch D into the released state, there is a case in which the dog clutch D1 is switched immediately to the engaged state from the released state. In view of heat generation in the synchromesh mechanism S1 resulting from the switching of the dog clutch D1 to the engaged state in such a case after the inhibition of the placement of the dog clutch D1 into the released state, it is preferable that the engaged state of the dog clutch D1 is maintained until heat dissipation has progressed to a certain degree.

When the switching of the dog clutch D1 to the released state is inhibited by the synchronization-operation limiting portion 99 during the running in the belt running mode, the state determining portion 98 determines whether the accumulated heat quantity Qs1 calculated by the accumulated-heat-quantity calculating portion 96 is smaller than the second quantity value B. This second quantity value B is, for example, a threshold value which is for making a determination as to heat dissipated from the synchro-carbon portion, and which is a quantity value that is sufficiently smaller than the first quantity value A such that the accumulated heat quantity Qs1 remains smaller than the first quantity value A even if more heat generation is caused in the synchro-carbon portion in case in which the synchronization OFF is allowed.

In a case in which it is determined by the state determining portion 98 that the accumulated heat quantity Qs1 in the synchromesh mechanism S1 is not smaller than the second quantity value B when the switching of the dog clutch D1 to the released state is being inhibited by the synchronization-operation limiting portion 99 during the running in the belt running mode, the synchronization-operation limiting portion 99 keeps inhibiting the switching of the dog clutch D1 to the released state, namely, keeps outputting the synchronization-OFF inhibiting command to the transmission-shifting control portion 94. On the other hand, in a case in which it is determined by the state determining portion 98 that the accumulated heat quantity Qs1 in the synchromesh mechanism S1 is smaller than the second quantity value B when the switching of the dog clutch D1 to the released state is being inhibited by the synchronization-operation limiting portion 99 during the running in the belt running mode, the synchronization-operation limiting portion 99 allows the switching of the dog clutch D1 to the released state, namely, outputs the synchronization-OFF allowing command that allows the switching of the dog clutch D1 to the released state, to the transmission-shifting control portion 94.

As described above, when the dog clutch D1 is in the engaged state during running of the vehicle 10 in a high speed range, the rotational speeds of the respective rotary members connected to the drive wheels 14 in the first drive-force transmitting path PT1 are made high whereby the durability of the friction members could be reduced due to increase of the difference between the input-side rotational speed and the output-side rotational speed of the first clutch C1. Therefore, during the running in a high speed range, it is preferable that the dog clutch D1 is placed in the released state even when the accumulated heat quantity Qs1 in the synchromesh mechanism S1 is a quantity value that inhibits the switching of the dog clutch D1 to the released state, namely, irrespective of whether the accumulated heat quantity Qs1 in the synchromesh mechanism S1 is larger than the above-described first quantity value A or not. That is, during the running in a high speed range, it is preferable that the dog clutch D1 is forcibly switched to the released state.

During running of the vehicle 10 in the belt running mode, the state determining portion 98 determines whether the running speed V is lower than a second speed value V2. This second speed value V2 is a threshold value based on which it is determined whether the running speed V is in an allowable speed range in which the engaged state of the dog clutch D1 is allowable, for example, for preventing the components of the gear mechanism 28 and the planetary gear device 26p from being rotated at excessively high speeds. That is, the second speed value V2 is a lower limit value of a predetermined high speed range, i.e., a non-allowable speed range in which the engaged state of the dog clutch D1 is not allowable, for example, for preventing the components of the gear mechanism 28 and the planetary gear device 26p from being rotated at excessively high speeds. The second speed value V2 is higher than the above-described first speed value V1. From another point of view that is for preventing over revolution of the engines 12, it is preferable that the stepped shift-down action is inhibited during rotation of the engine 12 at a high speed, so that it is not necessary to place the dog clutch D1 into the engaged state in preparation of execution of the stepped shift-down action, during rotation of the engine 12 at a high speed. Therefore, the second speed value V2 is also a lower limit value of a predetermined high speed range in which the running mode is inhibited from being switched from the belt running mode to the gear running mode, for example, for preventing the high speed rotation of the engine 12.

In a case in which it is determined by the state determining portion 98 that the running speed V is not lower than the second speed value V2, the synchronization-operation limiting portion 99 outputs the synchronization-OFF allowing command (that allows the switching of the dog clutch D to the released state) to the transmission-shifting control portion 94, even when the accumulated heat quantity Qs1 in the synchromesh mechanism S1 is a quantity value that inhibits the switching of the dog clutch D1 to the released state during the running in the belt running mode. On the other hand, in a case in which it is determined by the state determining portion 98 that the running speed V is lower than the second speed value V2, the synchronization-operation limiting portion 99 outputs the synchronization-OFF inhibiting command (that inhibits the switching of the dog clutch D1 to the released state) to the transmission-shifting control portion 94, in a case in which the accumulated heat quantity Qs1 in the synchromesh mechanism S1 is a quantity value that inhibits the switching of the dog clutch D1 to the released state during the running in the belt running mode. The above-described case in which the accumulated heat quantity Qs1 in the synchromesh mechanism S1 is a quantity value that inhibits the switching of the dog clutch D1 to the released state corresponds to a case in which it is determined by the state determining portion 98 that the accumulated heat quantity Qs1 in the synchromesh mechanism S1 is larger than the first quantity value A when the dog clutch D1 is in the engaged state, or to a case in which it is determined by the state determining portion 98 that the accumulated heat quantity Qs1 in the synchromesh mechanism S1 is not smaller than the second quantity value B when the dog clutch D1 is inhibited from being switched to the released state.

FIG. 4 is a flow chart showing a main part of a control routine executed by the electronic control apparatus 90, namely, a control routine that is executed for restraining reduction of function of the synchromesh mechanism S1, which is caused by increase of the accumulated heat quantity Qs1 during running of the vehicle 10 in the belt running mode. This control routine is executed in a repeated manner, for example, when the dog clutch D1 is in the engaged state during the running in the belt running mode.

As shown in FIG. 4, the control routine is initiated with step S10 corresponding to function of the accumulated-heat-quantity calculating portion 96, which is implemented to calculate the accumulated heat quantity Qs1 in the synchromesh mechanism S1. Step S10 is followed by step S20 corresponding to function of the state determining portion 98, which is implemented to make a heat-accumulated mode determination as to whether the accumulated heat quantity Qs1 in the synchromesh mechanism S1 is larger than the first quantity value A. When an affirmative determination is made at step S20, step S30 corresponding to function of the state determining portion 98 is implemented to make an allowable-speed-range determination as to whether the running speed V is lower than the second speed value V2. When an affirmative determination is made at step S30, step S40 corresponding to function of the synchronization-operation limiting portion 99 is implemented to inhibit the synchronization OFF, namely, to inhibit the switching of the dog clutch D1 to the released state. Step S40 is followed by step S50 corresponding to function of the accumulated-heat-quantity calculating portion 96, which is implemented to calculate the accumulated heat quantity Qs in the synchromesh mechanism S1. Step S50 is followed by step S60 corresponding to function of the state determining portion 98, which is implemented to make a heat dissipation determination as to whether the accumulated heat quantity Qs1 in the synchromesh mechanism S1 is smaller than the second quantity value B. When a negative determination is made at step S60, the control flow goes back to the above-described step S30. When a negative determination is made at step S20 or step S30, or when an affirmative determination is made at step S60, step S70 corresponding to function of the synchronization-operation limiting portion 99 is implemented to allow the synchronization OFF, namely, to allow the switching of the dog clutch D1 to the released state.

In the present embodiment, during the running of the vehicle 10 in the belt running mode, the dog clutch D1 is inhibited from being switched from the engaged state to the released state when the accumulated heat quantity Qs1 in the synchromesh mechanism S1 is larger than the first quantity value A, and is allowed to be switched from the engaged state to the released state when the accumulated heat quantity Qs1 in the synchromesh mechanism S1 is not larger than the first quantity value A. Thus, even if the running speed V remains in the vicinity of the first speed value V1, the switching of the dog clutch D1 between the engaged state and the released state can be restrained from being repeated in a short period when the accumulated heat quantity Qs1 in the synchromesh mechanism S1 is larger than the first quantity value A, so that a large quantity of heat is unlikely to be accumulated in the synchromesh mechanism S1. It is therefore possible to restrain reduction of function of the synchromesh mechanism S1 which could be caused by increase of the accumulated heat quantity Qs1, during running of the vehicle 10 in the belt running mode.

In the present embodiment, when the accumulated heat quantity Qs1 in the synchromesh mechanism S1 is larger than the accumulated heat quantity Qs1, the synchromesh mechanism S1 is protected by inhibiting the dog clutch D1 from being placed in the released state, rather than by inhibiting the dog clutch D1 from being placed in the engaged state. Thus, execution of the stepped shift-down action is not impeded so that the kickdown to the gear ratio EL of the gear mechanism 28 can be executed, for example.

In the present embodiment, during inhibition of switching of the dog clutch D1 from the engaged state to the released state, the dog clutch D1 is kept inhibited from being switched from the engaged state to the released state when the accumulated heat quantity Qs1 in the synchromesh mechanism S1 is not smaller than the second quantity value B (that is smaller than the first quantity value A), and the dog clutch D1 is allowed to be switched from the engaged state to the released state when accumulated heat quantity Qs1 in the synchromesh mechanism S1 is smaller than the second quantity value B. Thus, when the switching of the dog clutch D1 from the engaged state to the released state has been once inhibited, the engaged state of the dog clutch D1 is maintained until the heat is dissipated from the synchromesh mechanism S1 to a certain degree. Further, since the dog clutch D1 is allowed to be switched to the released state when the heat has been dissipated to a certain degree, a large quantity of heat is unlikely to be accumulated in the synchromesh mechanism S1, even if heat is generated in the synchromesh mechanism S1 in case of switching of the dog clutch D1 back to the engaged state immediately after switching of the dog clutch D1 to the released state.

In the present embodiment, when the running speed V of the vehicle 10 is not lower than the second speed value V2 (that is higher than the first speed value V1), the dog clutch D is allowed to be switched from the engaged state to the released state, irrespective of whether the accumulated heat quantity Qs1 in the synchromesh mechanism S1 is larger than the first quantity value A or not, or irrespective of whether the accumulated heat quantity Qs1 in the synchromesh mechanism S1 is larger than the second quantity value B or not. Namely, when the running speed V of the vehicle 10 is not lower than the second speed value V2, the dog clutch D1 is allowed to be switched from the engaged state to the released state, even if the accumulated heat quantity Qs1 in the synchromesh mechanism S1 is so large as a quantity value, which inhibits the dog clutch D1 from being switched from the engaged state to the released state as long as the running speed V is lower than the second speed value V2. Thus, when the running speed V is in the high speed range, the dog clutch D1 is placed in the released state whereby each of the rotary members in the first drive-force transmitting path PT1 is prevented from being rotated at an excessively high speed.

In the present embodiment, the second speed value V2 is the lower limit value of the running speed range in which the vehicle 10 is inhibited from being switched from the belt running mode to the gear running mode, for the purpose of preventing the engine 12 from being rotated at an excessively high speed. That is, the dog clutch D1 is placed in the released state when the running speed V is in a high speed range in which the dog clutch D1 is not required to be switched from the released state to the engaged state in preparation of switching of the running mode from the belt running mode to the gear running mode.

In the present embodiment, the accumulated heat quantity Qs1 in the synchromesh mechanism S1 is calculated based on the generated heat quantity Qoffon and the dissipated heat quantity Qon, wherein the generated heat quantity Qoffon is the predetermined quantity of heat generated in the synchromesh mechanism S in process of switching of the dog clutch D1 from the released state to the engaged state, and wherein the dissipated heat quantity Qon is the quantity of heat dissipated from the synchromesh mechanism S and is dependent on a length of time for which the dog clutch D1 is held in the engaged state. Thus, when the dog clutch D1 is in the engaged state, the dog clutch D1 is appropriately inhibited from being switched to the released state and is appropriately allowed to be switched to the released state.

While the preferred embodiment of this invention has been described in detail by reference to the drawings, it is to be understood that the invention may be otherwise embodied.

For example, in the above-described embodiment, when the dog clutch D1 is in the engaged state, the accumulated heat quantity Qs1 in the synchromesh mechanism S1 is calculated based on (i) the generated heat quantity Qoffon which is the predetermined quantity of heat generated in the synchromesh mechanism S1 in process of switching of the dog clutch D1 from the released state to the engaged state and (ii) the dissipated heat quantity Qon which is the quantity of heat dissipated from the synchromesh mechanism S1 and which is dependent on a length of time for which the dog clutch D1 is held in the engaged state. However, for example, an accumulated heat quantity Qs1 (=Qoffon+Qon+Qoff) [J] in the synchromesh mechanism S1 may be calculated based on, in addition to (i) the generated heat quantity Qoffon and (ii) the dissipated heat quantity Qon, (iii) a dissipated heat quantity Qoff (<0) [J] which is a quantity of heat dissipated from the synchromesh mechanism S1 and which is dependent on a length of time for which the dog clutch D1 is held in the released state.

In the above-described embodiment, the second clutch C2 is disposed in a drive-force transmitting path between the secondary pulley 64 and the output shaft 30. However, this arrangement is not essential. It is possible to employ a modified arrangement in which, for example, the second clutch C2 is disposed in a drive-force transmitting path between the primary pulley 60 and the input shaft 22. In this modified arrangement, the secondary shaft 62 is connected integrally with the output shaft 30, and the primary shaft 58 is connected to the input shaft 22 through the second clutch C2.

In the above-described embodiment, the gear mechanism 28 is a gear mechanism which provides a single gear ratio that is higher than the highest gear ratio γmax of the continuously-variable transmission mechanism 24. However, the gear mechanism 28 may be, for example, a gear mechanism which provides a plurality of different gear ratios. That is, the gear mechanism 28 may be a gear mechanism in which a shifting action is to be executed from one of two or more gear positions to the other. Further, the gear mechanism 28 may be a gear mechanism that provides a gear ratio that is lower than the lowest gear ratio γmin of the continuously-variable transmission mechanism 24 and another gear ratio that is higher than the highest gear ratio γmax of the continuously-variable transmission mechanism 24.

In the above-described embodiment, the running mode of the drive-force transmitting apparatus 16 is switched between the gear running mode and the belt running mode, by using the shifting map in which the shift-up line and shift-down line are defined. However, the running mode of the drive-force transmitting apparatus 16 may be switched by setting a gear ratio satisfying the required drive force Fdem that is calculated based on the running speed V and the accelerator operation amount θacc.

In the above-described embodiment, the torque converter 20 is used as fluid-operated drive-force transmitting device. However, in place of the torque converter 20, any one of other types of fluid-operated drive-force transmitting devices such as a fluid coupling, which do not have a torque boosting function, may be used, for example. Further, the fluid-operated drive-force transmitting device does not have to be necessarily provided.

It is to be understood that the embodiment described above is given for illustrative purpose only, and that the present invention may be embodied with various modifications and improvements which may occur to those skilled in the art.

NOMENCLATURE OF ELEMENTS

12: engine (drive force source)
14: drive wheels
16: vehicle drive-force transmitting apparatus
22: input shaft (input rotary member)
24: continuously-variable transmission mechanism
28: gear mechanism
30: output shaft (output rotary member)
90: electronic control apparatus (control apparatus)
94: transmission-shifting control portion
96: accumulated-heat-quantity calculating portion
99: synchronization-operation limiting portion
C1: first clutch (first frictional engagement device)
C2: second clutch (second frictional engagement device)
B1: first brake (first frictional engagement device)
D1: dog clutch
S1: synchromesh mechanism
PT1: first drive-force transmitting path
PT2: second drive-force transmitting path

What is claimed is:

1. A control apparatus for a drive-force transmitting apparatus that is to be provided in a vehicle having a drive force source and drive wheels,
wherein the drive-force transmitting apparatus includes: an input rotary member to which a drive force of the drive force source is to be transmitted; an output rotary member through which the drive force is to be transmitted to the drive wheels; a gear mechanism configured to provide at least one gear ratio; a continuously-variable transmission mechanism configured to provide a continuously-variable gear ratio that is lower than the at least one gear ratio of the gear mechanism; a first frictional engagement device; a second frictional engagement device; and a dog clutch that is provided with a synchromesh mechanism,
wherein the drive-force transmitting apparatus defines a plurality of drive-force transmitting paths that are provided in parallel with each other between the input rotary member and the output rotary member,
wherein the plurality of drive-force transmitting paths include a first drive-force transmitting path that is to be established by engagements of the first frictional engagement device and the dog clutch, such that the drive force is to be transmitted from the input rotary member to the output rotary member through the gear mechanism along the first drive-force transmitting path when the first drive-force transmitting path is established,
wherein the plurality of drive-force transmitting paths include a second drive-force transmitting path that is to be established by engagement of the second frictional engagement device, such that the drive force is to be transmitted from the input rotary member to the output rotary member through the continuously-variable transmission mechanism along the second drive-force transmitting path when the second drive-force transmitting path is established, and wherein said control apparatus comprises:

a transmission-shifting control portion configured, during running of the vehicle in a second running mode in which the vehicle is to run with the driving force being transmitted through the continuously-variable transmission mechanism along the second drive-force transmitting path, to place the dog clutch in a released state when a running speed of the vehicle is higher than a first speed value, and to place the dog clutch in an engaged state when the running speed of the vehicle is not higher than the first speed value;

an accumulated-heat-quantity calculating portion configured, when the dog clutch is placed in the engaged state during the running of the vehicle in the second running mode, to calculate an accumulated heat quantity that is a quantity of heat accumulated in the synchromesh mechanism; and a synchronization-operation limiting portion configured, during the running of the vehicle in the second running mode, to inhibit the dog clutch from being switched from the engaged state to the released state when the accumulated heat quantity in the synchromesh mechanism is larger than a first quantity value, and to allow the dog clutch to be switched from the engaged state to the released state when the accumulated heat quantity in the synchromesh mechanism is not larger than the first quantity value.

2. The control apparatus according to claim 1, wherein, during inhibition of switching of the dog clutch from the engaged state to the released state, said synchronization-operation limiting portion is configured, when the accumulated heat quantity in the synchromesh mechanism is not smaller than a second quantity value that is smaller than the first quantity value, to keep inhibiting the dog clutch from being switched from the engaged state to the released state, and is configured, when the accumulated heat quantity in the synchromesh mechanism is smaller than the second quantity value, to allow the dog clutch to be switched from the engaged state to the released state.

3. The control apparatus according to claim 1, wherein said synchronization-operation limiting portion is configured, when the running speed of the vehicle is not lower than a second speed value that is higher than the first speed value, to allow the dog clutch to be switched from the engaged state to the released state, irrespective of whether the accumulated heat quantity in the synchromesh mechanism is larger than the first quantity value or not.

4. The control apparatus according to claim 3, wherein the second speed value is a lower limit value of a running speed range in which the vehicle is inhibited from being switched from the second running mode to a first running mode in which the vehicle is to run with the driving force being transmitted through the gear mechanism along the first drive-force transmitting path.

5. The control apparatus according to claim 1, wherein said accumulated-heat-quantity calculating portion is configured to calculate the accumulated heat quantity in the synchromesh mechanism, based on a generated heat quantity and a dissipated heat quantity, wherein the generated heat quantity is a quantity of heat generated in the synchromesh mechanism in process of switching of the dog clutch from the released state to the engaged state, and wherein the dissipated heat quantity is a quantity of heat dissipated from the synchromesh mechanism, and is dependent on a length of time for which the dog clutch is held in the engaged state.

6. The control apparatus according to claim 2, wherein said synchronization-operation limiting portion is configured, when the running speed of the vehicle is not lower than a second speed value that is higher than the first speed value, to allow the dog clutch to be switched from the engaged state to the released state, irrespective of whether the accumulated heat quantity in the synchromesh mechanism is larger than the second quantity value or not.

7. The control apparatus according to claim 1, wherein said accumulated-heat-quantity calculating portion is configured to calculate the accumulated heat quantity in the synchromesh mechanism, such that the calculated accumulated heat quantity is a heat quantity value that is obtained by subtracting a dissipated heat quantity from a generated heat quantity, wherein the generated heat quantity is a quantity of heat generated in the synchromesh mechanism in process of switching of the dog clutch from the released state to the engaged state, and wherein the dissipated heat quantity is a quantity of heat dissipated from the synchromesh mechanism, and is increased with increase of a length of time for which the dog clutch is held in the engaged state.

8. The control apparatus according to claim 1, wherein said synchronization-operation limiting portion is configured, when the accumulated heat quantity in the synchromesh mechanism is larger than the first quantity value during the running of the vehicle in the second running mode, to inhibit the dog clutch from being switched from the engaged state to the released state, irrespective of whether the running speed of the vehicle is higher than the first speed value, and wherein said synchronization-operation limiting portion is configured, when the accumulated heat quantity in the synchromesh mechanism is not larger than the first quantity value during the running of the vehicle in the second running mode, to allow the dog clutch to be switched from the engaged state to the released state, as long as the running speed of the vehicle is higher than the first speed value.

* * * * *